United States Patent
Yoon et al.

(10) Patent No.: US 7,414,516 B2
(45) Date of Patent: Aug. 19, 2008

(54) SYSTEM AND METHOD FOR REMOTE CONTROLLING AND MONITORING ELECTRIC HOME APPLIANCES

(75) Inventors: Hong Shik Yoon, Changwon-shi (KR); Seung Myun Baek, Changwon-shi (KR); Koon Seok Lee, Changwon-shi (KR); Hwan Jong Choi, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 10/506,329

(22) PCT Filed: Apr. 9, 2002

(86) PCT No.: PCT/KR02/00634

§ 371 (c)(1),
(2), (4) Date: Sep. 2, 2004

(87) PCT Pub. No.: WO03/088583

PCT Pub. Date: Oct. 23, 2003

(65) Prior Publication Data

US 2005/0225426 A1    Oct. 13, 2005

(51) Int. Cl.
G05B 23/02 (2006.01)
(52) U.S. Cl. ............... 340/3.21; 340/3.43; 340/825.24
(58) Field of Classification Search ........... 340/3.21, 340/825.22, 825.24, 825.25
See application file for complete search history.

(56) References Cited

U.S. PATENT DOCUMENTS

| 4,855,730 | A | * | 8/1989 | Venners et al. ......... 340/825.24 |
| 5,008,879 | A | * | 4/1991 | Fischer et al. .......... 340/825.52 |
| 5,101,191 | A | * | 3/1992 | MacFadyen et al. ... 340/310.16 |
| 5,838,226 | A | * | 11/1998 | Houggy et al. ......... 340/310.11 |
| 5,922,050 | A | * | 7/1999 | Madany ................. 340/825.25 |
| 6,665,384 | B2 | * | 12/2003 | Daum et al. ........... 379/102.03 |
| 6,759,946 | B2 | * | 7/2004 | Sahinoglu et al. ...... 340/310.11 |
| 6,826,267 | B2 | * | 11/2004 | Daum et al. ................. 340/825 |
| 7,170,405 | B2 | * | 1/2007 | Daum et al. ........... 340/538.11 |

FOREIGN PATENT DOCUMENTS

JP    2000-184471    6/2000

OTHER PUBLICATIONS

Lee, K.S., et al., A New Control Protocol for Home Appliances—LnCP, IEEE Int'l Symposium on Industrial Electronics, 2001 Proceedings, Jun. 12-16, 2001, pp. 286-291, vol. 1.1, ISBN 0-7803-7090-2.
Lawton, G., Internet Appliances Struggle for Acceptance, Computer, Jul. 2001, pp. 12-15, vol. 34, Issue 7.
Meleis, H., Toward the Information Network, Computer, October 1996, pp. 59-67, vol. 29, Issue 10.

* cited by examiner

*Primary Examiner*—Edwin C Holloway, III
(74) *Attorney, Agent, or Firm*—McKenna Long & Aldridge LLP

(57) ABSTRACT

A system for remote controlling and monitoring a home appliance includes a first home appliance having a master function, at least one second home appliance having a slave function, and a communication line path for communication only between the first home appliance and at least one of the second home appliances. The master function is configured to control the slave function.

9 Claims, 7 Drawing Sheets

SYSTEM AND METHOD FOR REMOTE CONTROLLING AND MONITORING ELECTRIC HOME APPLIANCES

TECHNICAL FIELD

The present invention relates to a system and a method for remote controlling and monitoring home appliances, and more particularly, to a system and a method in which one main home appliance having a master function remote controls and monitors all the other home appliances having slave functions.

BACKGROUND ART

There are various home appliances being widely used in homes such as a TV, a refrigerator, a washing machine, a microwave oven, and an air-conditioner, each of which has a corresponding control device separately or a control part in its body, thereby being controlled by a remote controller or by the operation of its control part.

As the related art home appliances have their own remote controllers, however, the number of remote controllers increases as the number of the home appliances increases. Accordingly, a user comes to have a difficulty in keeping numerous remote controllers and finding the right remote controller each time he/she needs to control a certain home appliance. Also, as each home appliance is separately controlled, to integrate and optimize a home appliance system is not possible.

In addition, because of insufficient memory and functions of a microcomputer of home appliances, to remote control them by loading a protocol such as a transfer control protocol (TCP) in them is not easy.

DISCLOSURE OF THE INVENTION

Accordingly, the present invention is directed to a system and a method for remote controlling and monitoring electric home appliances that substantially obviate one or more problems due to limitations and disadvantages of the related art.

An object of the present invention is to provide a system and a method for remote controlling and monitoring home appliances in which one main home appliance has a master function to remote control and monitor all the other home appliances having slave functions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a system for remote controlling and monitoring home appliances includes a first home appliance having a master function, at least one second home appliance having a slave function, and a communication line path for communication between the first home appliance and at least one of the second home appliances.

A method for remote controlling and monitoring home appliances according to the present invention includes the following three steps. In the first step, a first home appliance reads the information of a second home appliance and sets communication speed and packet length corresponding to that information. Then, a user command is constituted as a first packet with the preset length and transmitted to the second home appliance at the preset speed. In the second step, the second home appliance corresponding to the first packet receives the first packet and checks if there is an error. If any error is not found in the first packet, the command of the first packet is performed and the second packet of ACK is constituted. On the other hand, if an error is found in the first packet, the second packet of NAK is constituted. Then one of the constituted second packets is transmitted to the first home appliance. In the third step, the first home appliance checks whether the second packet is received and then, according to the result, transmits the next packet or retransmits the first packet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention In the drawings.

BEST MODE FOR CARRYING OUT THE INVENTION

Reference will now be made in detail to the preferred embodiments of the present invention, examples of which are illustrated in the accompanying drawings.

Figure 1:
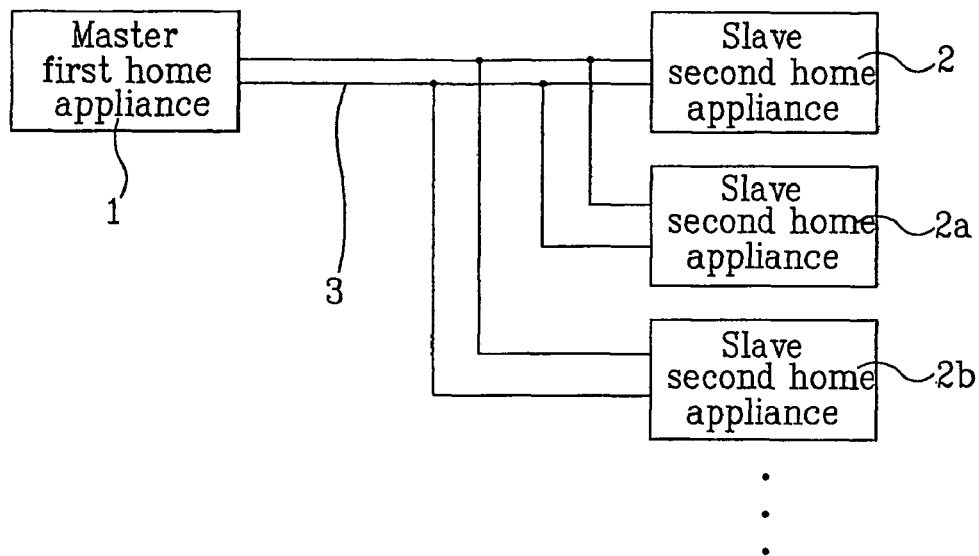
FIG. 1 is a schematic diagram illustrating a remote controlling and monitoring device for a home appliance in accordance with the present invention.
Figure 2:
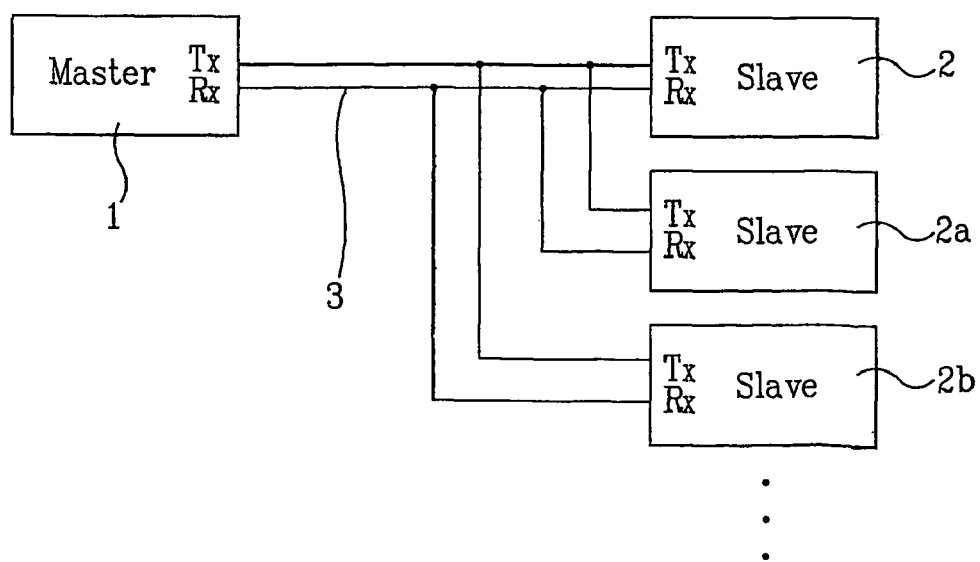
FIG. 2 is a schematic diagram illustrating remote controlling and monitoring devices for a home appliance, showing master and slave functions in accordance with the present invention.

FIG. 1 is a schematic diagram illustrating a remote controlling and monitoring device for a home appliance in accordance with the present invention and FIG. 2 is a schematic diagram illustrating remote controlling and monitoring devices, showing master and slave functions in accordance with the present invention.

As shown in FIGS. 1 and 2, a system for remote controlling and monitoring the home appliance includes a first home appliance 1 having a master function, at least one second home appliance 2 having a slave function, and a communication line path 3 for communication between the first and second home appliances.

The first home appliance 1 having the master function takes the initiative in all communications and issues a command. The second home appliance 2 having the slave function only carries out the command and returns the execution result of the command to the first home appliance 1 without issuing any order. The first and second home appliances communicate with each other by a half-duplex method in which they can communicate with each other in both directions but can not transmit and receive messages at the same time. Basically, the first and second home appliances perform the communication based on an one-to-one communication method. When the first home appliance 1 communicates with two and more second home appliances 2, the first home appliance 1 firstly transmits and receives at least one packet to and from one of the second home appliances 2 to start communication with the next second home appliance 2. That is, the first home appliance 1 can start the communication with the next second home appliance 2 only after transmitting at least one packet to the second home appliance and receiving the replay of at least one packet from the same.

Also, each packet being received from the second home appliances having the slave functions should be independent. For one time order transmission of the first home appliance 1, the second home appliance 2 can transmit only one packet to the first home appliance 2 and accordingly, the first home appliance receives only one packet reply.

Preferably, a personal computer is used for the first home appliance having the master function.

Master and slave functions will be described in detail as follows.

Figure 3:
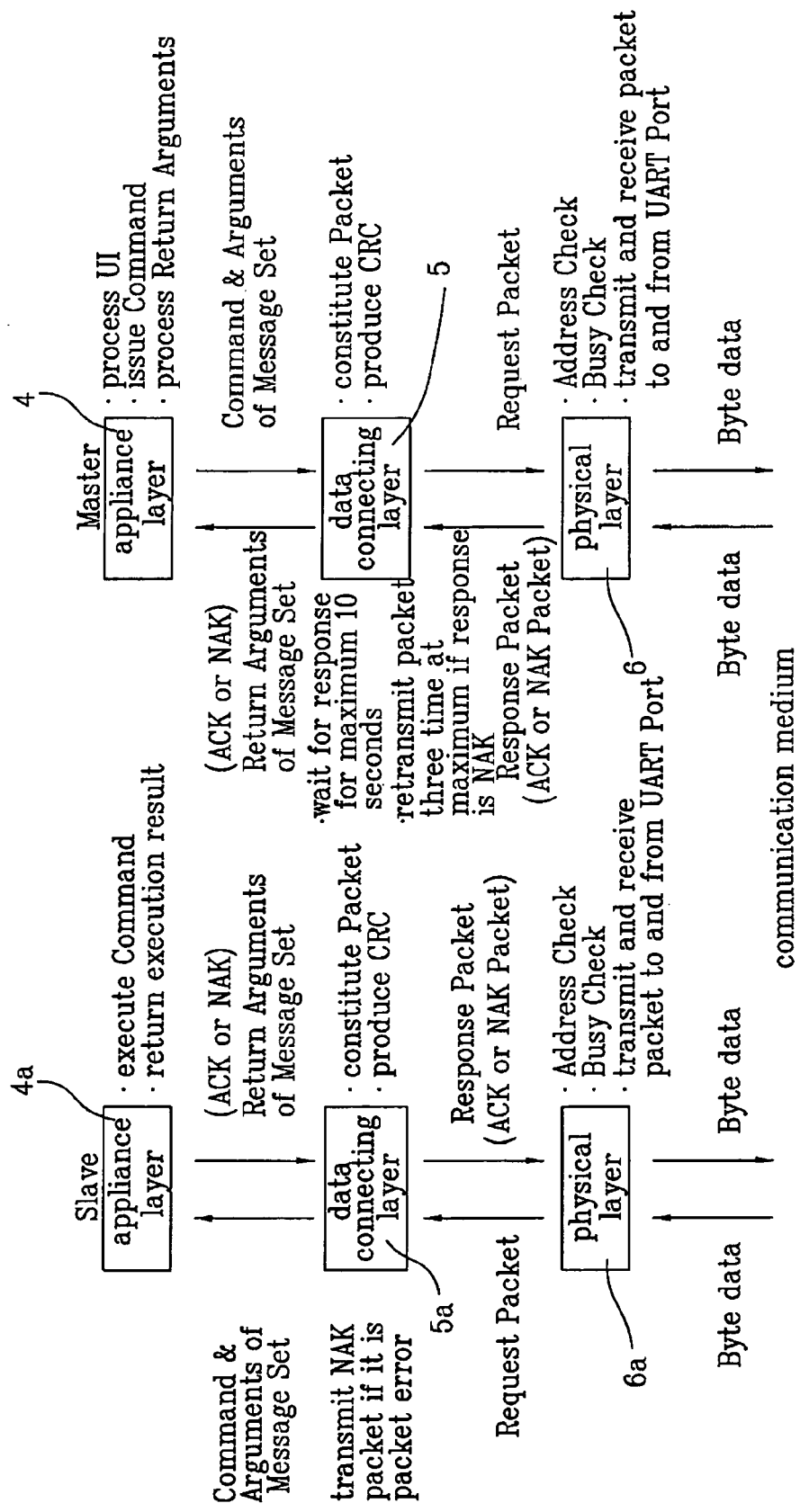
FIG. 3 is a block diagram illustrating a construction of a master and a slave in accordance with the present invention.

FIG. 3 is a block diagram illustrating constructions of the master and slave. The master for dealing with a received message and transmitting a message includes an application layer 4, a data connecting layer 5, and a physical layer 6. The application layer 4 performs functions of processing input data from a user interface (UI), producing a command code, dealing with return arguments from the slave, and transmitting the result to the data connecting layer 5. The data connecting layer 5 performs functions of constituting a packet by being provided with a command and arguments in the message from the application layer 4, producing and displaying a Cyclic Redundancy Check (CRC) for error checking, and displaying the message as the preset frequency if any error is found in the transmitted packet after receiving a reply packet. The physical layer 6 performs functions of checking an address upon receiving the packet (e.g., slave's reply packet) from the data connecting layer 5, and determining whether a communication line path (bus line) between the master and slave is vacant to transmit and receive the packet to and from a Universal Asynchronous Receiver/Transmitter (UAIRT) terminal.

In the mean time, the slave includes an application layer 4a, a data connecting layer 5a, and a physical layer 6a. The application layer 4a carries out a command from the master and replies the result. The data connecting layer 5a performs functions of constituting a packet according to the reply from the application layer 4a, producing and displaying a CRC for error checking, and displaying the received order and arguments on the application layer 4a. The physical layer 6a performs functions of receiving the packet (e.g., the master's packet) from the data connecting layer Sa, checking its address, determining whether a communication line path (bus line) between the master and slave is vacant to transmit the packet to a UART terminal, and transmitting the received packet from the master to the data connecting layer 5a.

At this time, the data connecting layers 4 and 4a and the physical layers 5 and 5a are formed as one module.

Figure 4:
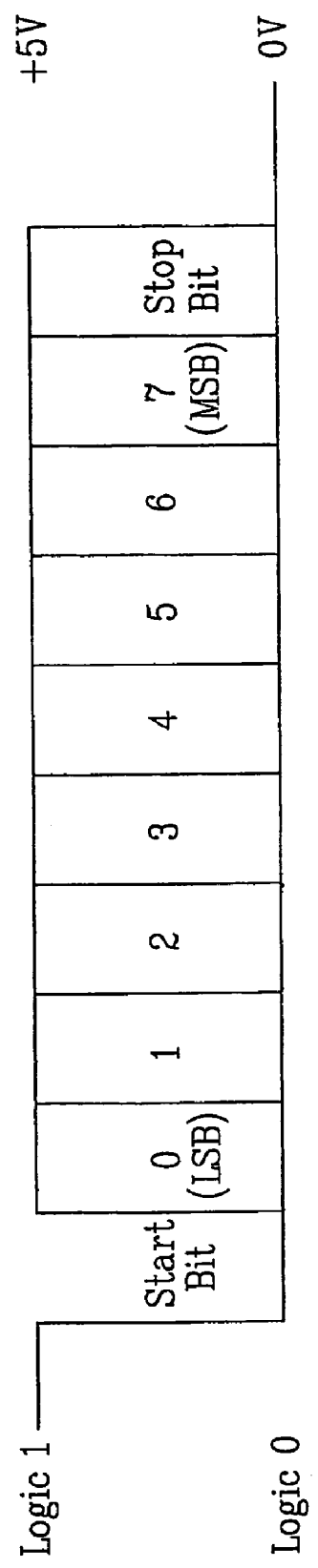
FIG. 4 is a schematic diagram illustrating a UART frame in accordance with the present invention.

FIG. 4 shows the construction of a UART frame.

As shown in FIG. 4, a UART port transmits 8 bits after an alloted start bit in a descending order from the smallest value. At this time, the default value of the transmission speed is about 2400 bps within a changeable range of 110-38400 bps.

Figure 5:
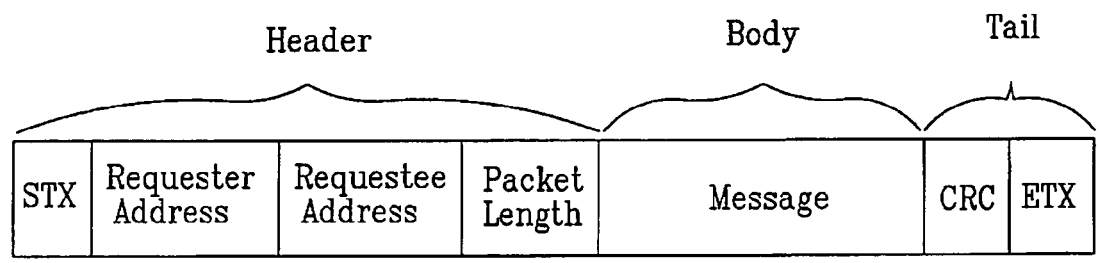
FIG. 5 is a schematic diagram illustrating a packet in accordance with the present invention.

A construction of one packet will be described with reference to FIG. 5 illustrating a schematic diagram of a construction of the packet in accordance with the present invention. The packet of the present invention includes a header, a body, and a tail. The header includes a starting code of the packet (STX), a requester address of a device (slave or master) to receive the packet, a requestee address of a device (master or slave) to transmit the packet, and the packet length (the number of bytes constituting the packet including codes for starting and ending the packet). The body is constituted with messages, which are control orders set in the application layer. The tail is constituted with a code (CRC) for error checking and an ending code (ETX) of the packet. At this time, the starting and ending codes (STX and ETX) are constituted with 1-byte respectively and the error checking code (CRC) is constituted with 2-bytes. The others are constituted with n-byte(s), thereby forming one packet having 256 bytes at maximum.

The constitution of the message will be described below.

Figure 6:
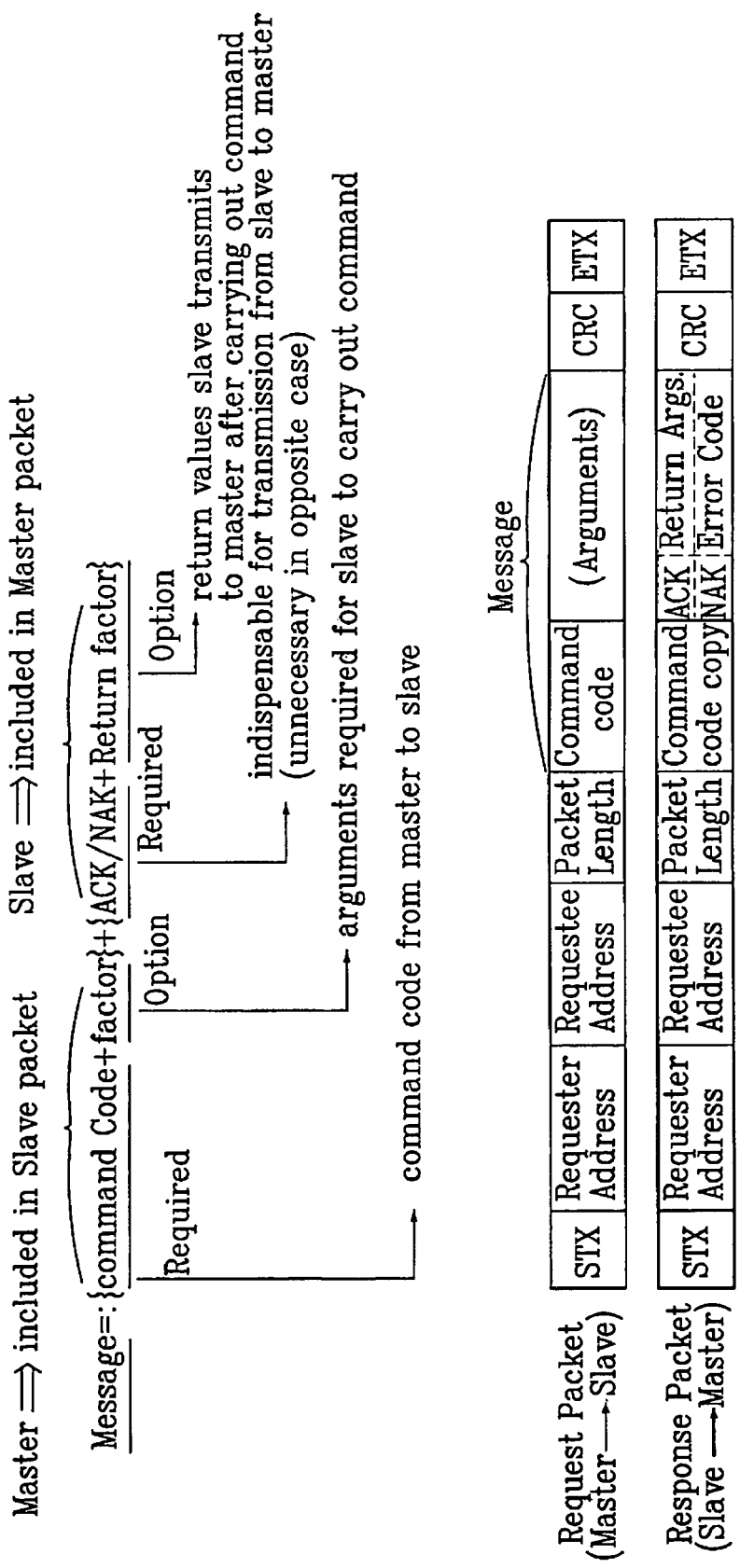
FIG. 6 is a schematic diagram of a message in accordance with the present invention.

FIG. 6 is a schematic diagram illustrating a construction of a message of the present invention. The message is the information required when a master controls or monitors a slave or when the slave returns a command execution result to the master.

Accordingly, the packet message sent by the master is constituted with a "command code" showing a command from the master to the slave and a "factor" or factor code showing arguments required for the slave to perform the command. The return packet message from the slave to the master is constituted with a "command code copy" from the master and "ACK/NAK code" and "return arguments or error code" showing whether the packet from the master is successively received and performed or not received.

A method for performing the communication between first home appliance and at least one second home appliance having the above-described master and slave functions respectively will be described below.

Figure 7:
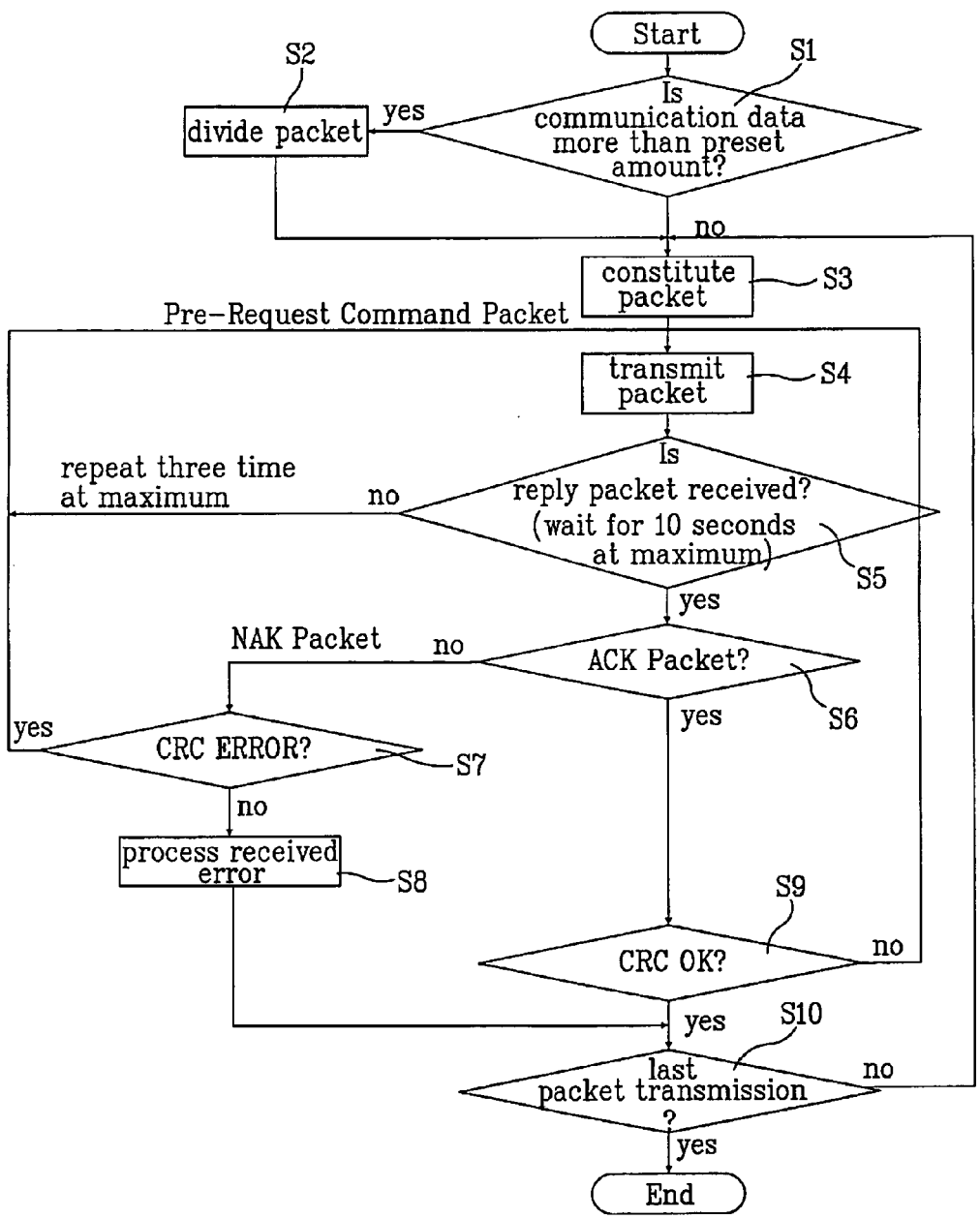
FIG. 7 is a flow chart illustrating a transmitting and receiving method of a first home appliance having a master function.
Figure 8:
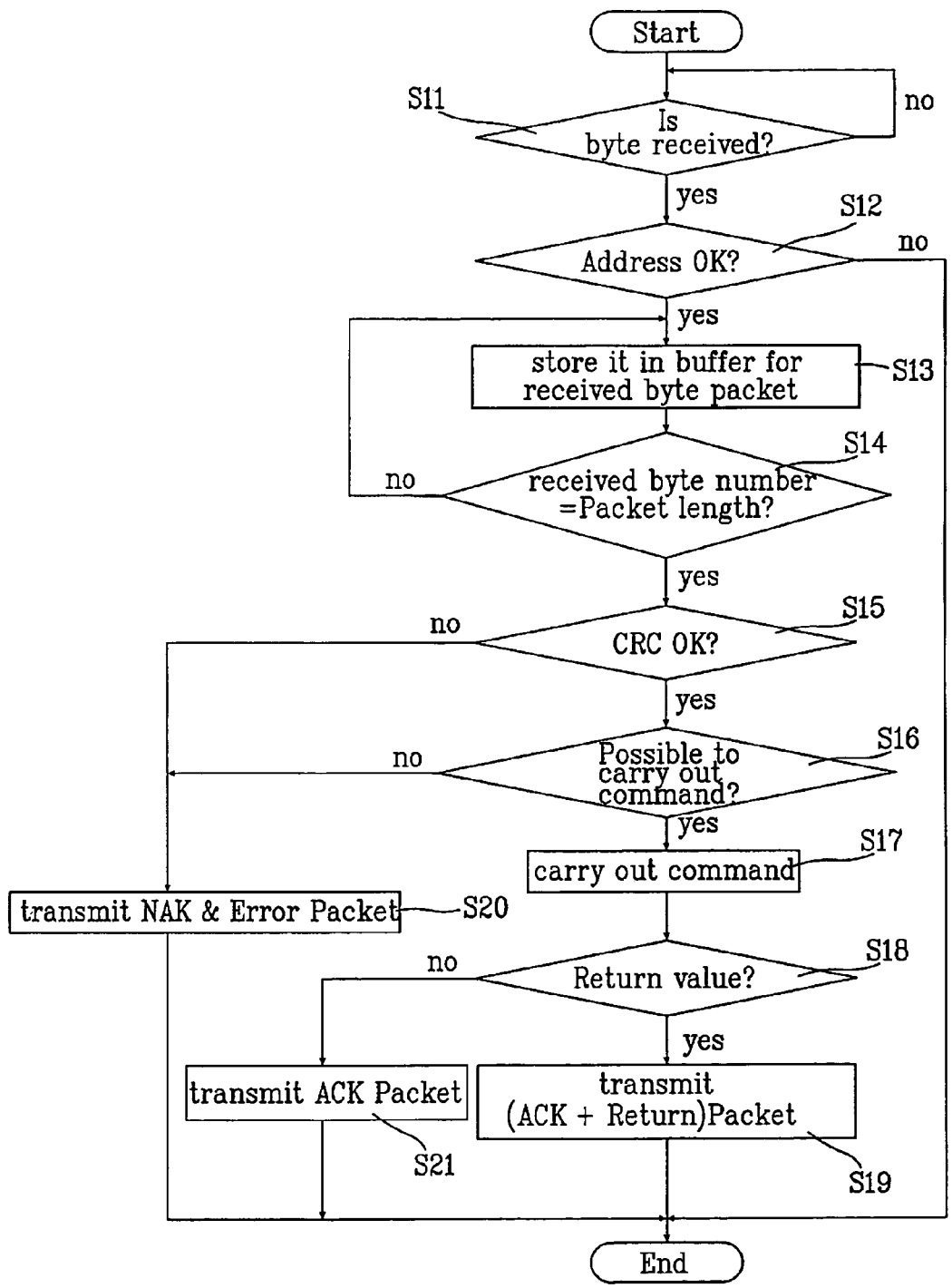
FIG. 8 is a flow chart illustrating a transmitting and receiving method of a second home appliance having a slave function.

FIG. 7 is a flow chart illustrating a transmitting and receiving method of a first home appliance having a master function and FIG. 8 is a flow chart illustrating a transmitting and receiving method of a second home appliance having a slave function.

First, an operation of the master will be described.

As shown in FIG. 7, the master reads information of the second home appliances being connected thereto by a communication line path so as to set communication speed and also reads the maximum packet length used in products. Then, the master checks the amount of communication data. If the amount of the communication data is more than a preset amount (S1), the master divides a packet (S2) but if it is less than the preset amount, the master constitutes a packet without dividing it (S3). As described in FIG. 4, the packet is constituted with a packet starting code (STX), a slave address (requester address) for receiving the packet, a master address (requestee address), packet length (the number of bytes constituting the packet), a message, a code (CRC) for error checking, and a code (ETX) for ending the packet.

The packet having the above-described construction is transmitted (S 4). For a preset time period (10 sec) after the transmission, it is checked whether a reply packet for the transmitted packet is received. If the reply packet is received (S5), it is checked whether the packet is an ACK packet or a NAK packet (S6). If the reply packet is not received for a preset time period (S5), the packet is transmitted for a maximum of three times. If the reply packet is the NAK packet showing an error (S6), it is determined whether the error is a CRC error for checking the error of the packet. If the reply packet has a CRC error (S7), the packet is transmitted for a maximum of three times. If the error is not a CRC error, the error is treated as a reply error and the received error is processed (S8).

If the reply packet is the ACK packet (the reply packet showing that the command transmitted from the master is being carried out successfully in the slave), it is determined whether the CRC, a code for error checking, is in a normal state (S 9). If the CRC is not in the normal state, the packet is transmitted again but if the CRC is in the normal state, the next packet is transmitted. When the transmission is completed in this way, the operation of the master is finished.

The operation of the slave will be described with reference to FIG. 8.

Firstly, it is checked whether byte is received. If the byte is received (S 11), the requester address, i.e., a slave address of the packet transmitted from the master, is checked (S 12). If the address is a corresponding slave address, the received packet is stored in a buffer (S 13).

Then, it is checked if the number of the bytes of the received packet accords with the packet length (S 14). If the number of the bytes and the packet length do not accord, the operation is not carried out any further but if they accord with each other, the code CRC for error checking is checked (S 15).

If an error is found in the CRC, a packet showing "NAK & error" is constituted and transmitted (S 20), but if any error is not found it is determined whether it is possible to carry out a control command of the packet (S 16). If it is determined impossible to carry it out, the packet showing "NAK & error" is constituted and transmitted (S 20) but if it is determined possible to carry it out, the command is carried out (S 17). Subsequently, if the result value has to be notified by carrying out the command (S 18), the packet of "ACK+return value" is constituted and transmitted (S 19). If the result value needs not to be notified, however, the packet of "ACK" is constituted and transmitted (S 21).

INDUSTRIAL APPLICABILITY

As described above, a method and a system for remote controlling and monitoring home appliances has the following advantages.

First, as one home appliance controls all the other home appliances, it is not necessary to have several remote controllers. Also, the home appliances become integrated and most suitable.

Second, a communication line path can be formed with a simple construction as one home appliance having a master function controls the other home appliances having slave functions.

While the present invention has been described and illustrated herein with reference to the preferred embodiment thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A system for remote controlling and monitoring a home appliance, comprising:
   a first home appliance having a master function, the master function being provided to the first home appliance;
   at least one second home appliance having a slave function, wherein the master function is configured to control the slave function; and
   a communication line path for communication to a next second home appliance only after transmitting at least one packet to the second home appliance and receiving a reply of the at least one packet from the second home appliance,
   wherein the first home appliance reads information of the second home appliance to set communication speed and packet length corresponding to the information, wherein if the amount of the data is more than a preset amount, then the packet is constituted by being divided and the communication speed is adjusted.

2. The system of claim 1, wherein a personal computer communicating with remote appliances is the first home appliance.

3. The system of claim 1, wherein the master function includes:
   an application layer producing a command code and a factor code from packet data of a received message and analyzing a return packet;
   a data connecting layer constituting a packet of data to be transmitted, producing an error checking code, and repeatedly transmitting the packet if a return packet is a NAK or not found; and
   a physical layer checking an address of the packet produced in the data connecting layer, determining whether a communication line path between the first appliance and the second appliance is vacant to transmit the packet, and delivering the transmitted packet to the data connecting layer.

4. The system of claim 1, wherein the slave function includes:
   an application layer carrying out a command of the received packet and returning an execution result of the command;
   a data connecting layer transmitting the received packet to the application layer, transmitting a NAK packet if an error is found in the received packet, constituting a return packet, and producing an error checking code; and
   a physical layer checking an address of the packet produced in the data connecting layer, determining whether a communication line path between the master and slave is vacant to transmit the packet, and delivering the transmitted packet to the data connecting layer.

5. The system of claim 4, wherein the data connecting layer and the physical layer are constituted as one module.

6. The system of claim 1, wherein the first and second home appliances communicate with each other in a half-duplex method such that the first and second home appliances communicate with each other in both directions and are not configured to transmit and receive messages at the same time.

7. A method for remote controlling and monitoring a home appliance, in which a system and a method for remote controlling and monitoring a home appliance are provided with a first home appliance, a second home appliance, and a communication line path for communication between the first and second home appliances, comprising:

having a first home appliance perform processes of reading information of the second home appliance to set communication speed and packet length corresponding to the information, constituting a user command as a first packet with the preset length, and transmitting the first packet to a second home appliance at the preset speed;

having the second home appliance corresponding to the first packet perform processes of receiving the first packet, checking an error, performing the command of the first packet and constituting a second packet of ACK if an error is not found in the first packet and constituting the second packet of NAK if an error is found in the first packet, and transmitting the constituted second packet to only the first home appliance; and having the first home appliance perform processes of checking whether the second packet is received, and transmitting the next packet or re-transmitting the first packet according to a result obtained from said checking, wherein the first home appliance is configured to start communication with a next second home appliance only after transmitting the first packet to the second home appliance and receiving the second packet from the second home appliance, wherein if the amount of the user command data is more than a preset amount, then the first packet is constituted by being divided and the communication speed is adjusted.

8. The method of claim 7, wherein the first packet includes:
a starting code (STX) of the packet;
a requester address, a second home appliance address to which the packet is transmitted;
a requestee address, a first home appliance address;
a packet length code indicating the number of bytes constituting the packet;
a message of control orders;
a CRC code for error checking; and
an ending code (ETX) of the packet.

9. The method of claim 7, wherein the second packet includes:
a starting code (STX);
a requester address, a first home appliance address to which the packet is transmitted;
a requestee address, a second home appliance address from which the packet is transmitted;
a packet length code indicating the number of bytes constituting the packet;
a control command code and executing or non-executing code;
a CRC code for error checking; and
an ending code (ETX) of the packet.

* * * * *